United States Patent Office 3,076,701
Patented Feb. 5, 1963

3,076,701
AMMONIUM PHOSPHATE FERTILIZER AND PREPARATION THEREOF
Frederick C. Bersworth, Framingham Center, and Albert E. Frost, Millis, Mass., assignors, by direct and mesne assignments, to The Dow Chemical Company, Midland, Mich., a corporation of Delaware
No Drawing. Filed Oct. 25, 1954, Ser. No. 464,654
11 Claims. (Cl. 71—43)

This invention relates to an improved method for producing ammonium fertilizers and to a composition of matter having improved fertilizer value over similar fertilizers.

The manufacture of ammonium phosphate fertilizers by the ammoniation of production phosphoric acid mixture of phosphoric and sulfuric acids, nitric acid, or mixture of nitric and sulfuric acid, is subject to certain difficulties arising from the presence of heavy metal ions in the acids. For example, such heavy metals form insoluble phosphates which must be removed if a clear product is to be obtained.

The current practice of producing ammonium phosphate fertilizer consists in the ammoniation, i.e., neutralization by ammonia gas, of wet-process phosphoric acid, or a mixture of phosphoric and sulfuric acids, to pH 3.0 to 4.0, followed by evaporation, granulation and drying.

The production phosphoric acid contains small quantities of heavy metal ions which precipitate out as their respective phosphates; for example, iron appears as ferric phosphate. A typical analysis of production phosphoric acid is shown below:

| | $P_2O_5$ | $Al_2O_3+Fe$ | F |
|---|---|---|---|
| Production phosphoric acid, percent | 33.0 | 2.0 | 2.00 |

A typical analysis of 11–48–0 and 16–20–0 ammonium phosphate produced according to the current procedure outlined above is as follows:

AMMONIUM PHOSPHATE

| | $P_2O_5$, percent | | Nitrogen, precent | | CaO, percent | $Al_2O_3$ +Fe, percent | F, percent | $SiO_2$, percent |
|---|---|---|---|---|---|---|---|---|
| | Avail. | Total | Total | $H_2O$ Sol. | | | | |
| 11–48–0 | 48.2 | 48.7 | 11.5 | 11.1 | 2.0 | 3.4 | 3.4 | 1.9 |
| 16–20–0 | 20.1 | 20.3 | 16.4 | 16.2 | 1.4 | 1.5 | 1.5 | 1.3 |

It is, accordingly, a fundamental object of this invention to provide an improved method for producing ammonium fertilizers without the complications produced by heavy metals.

It is a further object of this invention to provide ammonium phosphate fertilizers containing chelating agents and/or metal chelates.

Other objects and advantages will in part be obvious and in part appear hereinafter.

Still another object of this invention is to provide a composiiton of ammonium phosphates containing chelating agents and/or metal chelates, such that iron and other essential trace elements are made available to plants in the form of their chelates. It is still another object of the invention to provide an ammonium phosphate fertilizer containing a free chelating agent for solubilizing and rendering trace elements present in the soil available to plants.

We have discovered that to eliminate formation of insolube salts during ammoniation of production acids and mixtures of acids a chelating agent capable of forming a soluble, stable chelate with the heavy metal ions present, iron and aluminum in particular, is added thereto in amount sufficient to chelate all the metal present. The effect is not only to keep the metals in solution during the ammoniation but also to render them available to plants as part of the fertilizer produced. The chelating agents applicable to this invention conform to the following generic formula:

wherein X represents a member of the group consisting of

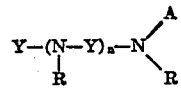

—$CH_2CH_2COOM$, —$CH_2COOM$, —$CH_2CH_2OH$; and Y represents a bivalent alkylene radical which places 2–3 carbon atoms between the nitrogen atoms and is preferably ethylene, trimethylene, isopropylene, cyclohexylene; R represents —$CH_2CN$, —$CH(CH_3)CN$, $CH_2CH_2CN$, —$CH_2COOM$, —$CH(CH_3)COOM$, —$CH_2CH_2COOM$; A equals R and one or both may be the same as R and —$CH_2CH_2OH$, —$CH(CH_3)$—$CH_2OH$; $n$ is 0, 1, 2 and 3 and M represents hydrogen, ammonium, substituted ammonium and alkali metal.

Prior to ammoniation, a predetermined amount of chelating agent is added to the phosphoric acid or phosphoric acid-sulfuric acid mixture. The quantity of chelating agent, for example, ethylenediaminetetraacetic acid and its alkali metal salts added may be in stoichiometric ratio to the heavy metal contaminants present, but preferably is in excess.

The acid forms of the chelating agents conforming to the generic formula are soluble in the acid solutions employed. The nitriles, when used, are less soluble in the phosphoric acid and phosphoric acid-sulfuric acid mixtures than their corresponding acids. However, under the conditions of ammoniation, hydrolysis of the nitriles occurs with formation of the corresponding acids. The ammonia released on hydrolysis as per the following equation using ethylenediaminetetraacetonitrile as example:

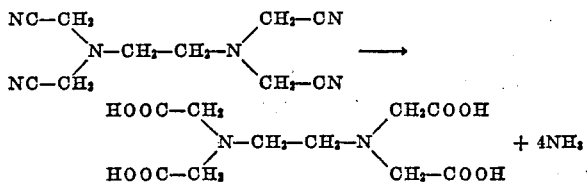

is bound up by the acid present.

The utilization of an excess of chelating agent or precursors of chelating agents, the nitriles, over and above that required to react with the heavy metal contaminants present serves to improve the ammonium phosphate fertilizer produced, because the excess chelating agent serves to solubilize and render available to plants trace mineral nutrients normally present in the soil in insoluble form and, hence, unavailable to the plant.

The preformed metal chelates of the trace metal elements may also be added to the production phosphoric acid alone or in conjunction with a stoichiometric or excess quantity of chelating agent. Typical preformed chelates which may be added are those of manganese, magnesium, zinc, iron, molybdenum, etc. Ammonium phosphate fertilizers containing the preformed trace metal chelates when applied to the soil effect a more rapid elimination of trace element deficiencies than do such compositions which contain chelating agents and little or no metal chelates.

However, the use of an excess of free chelating agent in such a composition possesses the advantage that cationic and anionic constituents become activated in the soils to which such a composition is applied. That is, the chelating agent puts metals in the soil into soluble form and, at the same time, induces the release of corresponding equivalents of the acid or anion. For example, calcium or iron phosphate in the soil is solubilized by free chelating agent, the calcium or iron appearing as the chelate with release of a corresponding amount of phosphoric acid.

In the preparation of ammonium nitrate fertilizers and ammonium nitrate-ammonium sulfate mixtures, neutralization of the acids or acid mixtures is practiced and the technique applied to the phosphoric acids is directly applicable to the nitric acid. Thus in any of the following examples it is to be understood that the acid subjected to the neutralization treatment may be nitric, sulfuric, phosphoric or any mixture of these.

The following examples will illustrate briefly the formulation of fertilizers in accordance with this invention.

EXAMPLE 1

To 1 kilogram of production phosphoric acid containing 2% of aluminum oxide plus ferric oxide, there was added 3.7 grams of ethylenediaminetetraacetic acid (EDTA used based on 2% $Fe_2O_3$ present). Upon subsequent ammoniation the small amount of iron and aluminum present remained in solution as their respective chelates. Upon evaporation of the neutralized mass, a granular ammonium phosphate containing the metal chelates is obtained.

EXAMPLE 2

Ammonium phosphate fertilizer was prepared as in Example 1, but using 7.5 grams (a two times excess) of EDTA. The finished fertilizer contained excess chelating agent which exhibited ability to dissolve ferric phosphate added to it.

EXAMPLE 3

To 1 kilogram of production phosporic acid there was added 7.5 grams of EDTA and 50 grams of the iron chelate of EDTA. Results similar to those described above were obtained.

Application of the finished fertilizer to chlorotic corn plants completely eliminated the iron deficiency within 4 weeks. Rate of addition was about one ounce per plant; pH of soil was about 6.

EXAMPLE 4

Preparation of the fertilizer followed the proportions given in Example 3, but N-hydroxyethylethylenediaminetriacetic acid and its iron chelate were used. Identical results were obtained. The product is also effective on alkaline soils.

EXAMPLE 5

50 grams of ethylenediaminetetraacetonitrile was added to 1.5 kilograms of production phosphoric acid. Upon ammoniation the temperature rises to 100 to 105° C. and causes hydrolysis and solution of the nitrile. The product results as in Example 1.

EXAMPLE 6

In place of the EDTA used in any of the Examples 1–3, the ethanolethylenediaminetriacetic acid of Example 4 or nitrile used in Example 5 any of the following may be used in corresponding amounts with essentially the same results:

Monoethanolethylenediaminetriactic acid and corresponding acetonitrile,
Diethanolethylenediaminediacetic acid and corresponding acetonitrile,
Corresponding propanol compounds, propionic acid compounds, and compounds based on trimethylenediamine.

Some of the physical chemical considerations which illuminate the phenomena observed in preparation and use of this fertilizer are as follows:

Agricultural ammonium phosphate is produced by neutralization of crude phosphoric acid with ammonia gas. The crude acid is contaminated with heavy metals such as Fe (III), Cu (II), Mn (II), Al (III), etc., which are precipitated as a sludge during the neutralization process. The heavy metals in this form are unavailable to the plants as minor nutritional elements. The incorporation of ethylenediaminetetraacetic acid, or other chelating agent as described herein, makes them available.

The ammonium fertilizer (phosphate, nitrate, sulfate or mixture) may also be prepared by forming the composition and spraying preformed metal chelates onto the material before granulating or pelleting it. A typical product of this kind would contain, for example, equal parts of ammonium sulfate, ammonium dihydrogen phosphate, a small amount of a potassium salt and about 0.01 to 1 percent by weight of each of the preformed chelates of iron, zinc and copper. The exact metals to be used may vary as agricultural conditions require.

In this review of the relationship it will be assumed that the system is phosphoric acid-ethylenediamine-tetraacetic acid and the remarks will be applicable, with minor variations, to the other chelating agents described.

A discussion of the equilibria involved is based upon the fact that both hydrogen ions and the metal ions are Lewis acids (electron acceptors) which have affinities for the phosphate and chelating agent ligands. Both phosphate and EDTA anions are strong Lewis bases (electron donors) and have consequently an affinity for hydrogen ions:

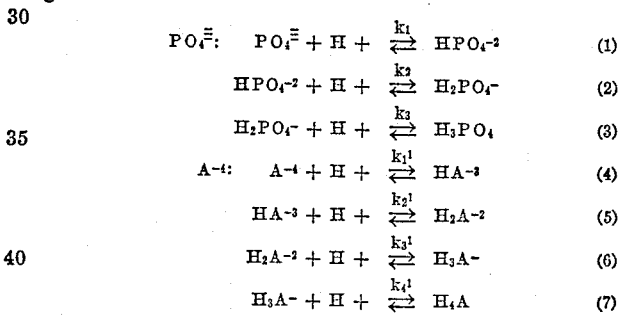

$$PO_4^\equiv: \quad PO_4^\equiv + H + \underset{}{\overset{k_1}{\rightleftarrows}} HPO_4^{-2} \qquad (1)$$

$$HPO_4^{-2} + H + \underset{}{\overset{k_2}{\rightleftarrows}} H_2PO_4^- \qquad (2)$$

$$H_2PO_4^- + H + \underset{}{\overset{k_3}{\rightleftarrows}} H_3PO_4 \qquad (3)$$

$$A^{-4}: \quad A^{-4} + H + \underset{}{\overset{k_1^1}{\rightleftarrows}} HA^{-3} \qquad (4)$$

$$HA^{-3} + H + \underset{}{\overset{k_2^1}{\rightleftarrows}} H_2A^{-2} \qquad (5)$$

$$H_2A^{-2} + H + \underset{}{\overset{k_3^1}{\rightleftarrows}} H_3A^- \qquad (6)$$

$$H_3A^- + H + \underset{}{\overset{k_4^1}{\rightleftarrows}} H_4A \qquad (7)$$

The reciprocal of the step-wise dissociation constants is a measure of this affinity of the ligand for hydrogen ions.

The affinity of the metal ions with $PO_4^\equiv$ and $A^{-4}$ may also be defined. For example, the interaction of Fe (III) ions with $PO_4^\equiv$ to form the slightly soluble ferric phosphate, $FePO_4$, may be defined by the solubility product:

$$(Fe^{+3})(PO_4^{-3}) = K_{sp} \qquad (8)$$

where the quantities in brackets denote molar concentrations. The affinity of Fe (III) ions for $(A^{-4})$ is defined by the corresponding chelate formation constant, K:

$$K = \frac{(MeA^-)}{(Fe^{+3})(A^{-4})} \qquad (9)$$

Since the amounts of $(A^{-4})$ and $(PO_4^{-3})$ are pH dependent according to Equations 1 to 7, the amount of free metal ion in equilibrium with both $FePO_4$ and $FeA^-$ is also pH dependent.

Consider now the interactions occurring during the manufacture of ammonium phosphate containing ethylenediamine-tetraacetic acid.

(1) *Phosphoric Acid and EDTA Mixture*

The solution pH is very low. Since the hydrogen ion concentration is very high most of the phosphorus is present in the form of $H_3PO_4$ (and $H_2PO_4^-$). Consequently, $(PO_4^{-3})$ content is negligible, and the amount of $(Fe^{+3})$ in solution (Equation 8) will be a maximum. In other words, the ferric phosphate is soluble under these conditions. Similarly EDTA is present primarily as the free acid or the corresponding positive ions $H_5A^+$ or $H_6A^{+2}$. Since $(A^{-4})$ is negligible (Equation 9), then the iron chelate is primarily dissociated. In any case, under these conditions, the ferric ion is soluble and no sludge formation occurs.

(2) The Ammoniation Step

The addition of ammonium results in a depletion of hydrogen ions (increase in pH), which in turn increases the concentration of $(PO_4^{-3})$ by Equations 1 to 3 and of $(A^{-4})$ by Equations 4 to 7. An increase in the former results in a decrease of the amount of $(Fe^{+3})$ that can be maintained in solution, and $FePO_4$ would precipitate. The amount of $FePO_4$ precipitated would, therefore, increase with pH.

In the case of the EDTA equilibria, an increase in $(A^{-4})$ results in an increased formation of the soluble iron chelate $(FeA^-)$. Since the affinity of $(A^{-4})$ for Fe (III) is greater than that of $(PO_4^{-3})$ for the metal, then the free metal ion concentration would be lowered to such an extent due to chelate formation that the solubility product of $FePO_4$ would not be exceeded. Consequently, no precipitation of the metal phosphate would occur. In addition, the Fe in chelate form is now available to the plant. The behavior of the other heavy metals is similar, even though the equilibrium concentrations may differ due to different affinities of the $(PO_4^{-3})$ and $(A^{-4})$ ligands for these metal ions.

Utilizing the considerations and specific information set forth above, it is indicated that a system which is characterized by the presence of an acid and traces of heavy metals may be controlled in accordance with the principles of this invention by rendering the traces of metals soluble through chelation reaction. For example, sulfuric acid, as commercially available, is commonly contaminated with lead, the source of which is the lead chambers used in the process of manufacture. The lead often causes complications in such operations as the manufacture of rayon, because sulfuric acid is used as a coagulant for the fibers. In this respect it may also be mentioned that zinc is added to sulfuric acid as zinc sulfate, to give certain physical characteristics to the rayon which is produced. This zinc has a tendency to remain on the rayon and cause difficulty when the product is used for the manufacture of tire cords.

This situation is subject to control if the zinc is added to the sulfuric acid bath as the sodium zinc chelate of mono hydroxy ethyl ethylene diamine triacetic acid, whereby the zinc ions will be liberated in the acid medium in accordance with the following equation:

$$NaZn\ EEDTA + 2H^+ \rightarrow Na\ H_2\ EEDTA + Zn^{++}$$

The zinc ions thus liberated are chemically like the zinc ions obtained from zinc sulfate. Zinc ions also have their desired effect on the rayon and for each zinc ion present there is an ion of the free chelating agent in the strong acid medium. When neutralization of the acid coagulant for the fiber occurs the following reaction takes place:

$$EEDTA^\equiv + Zn^{++} \rightarrow Zn\ EEDTA^-$$

and the zinc chelate, being water-soluble, is easily removed by rinsing.

In addition, since lead is preferentially complexed in any system with zinc, the following reaction will take place with whatever lead ions may be present:

$$Zn\ EEDTA^- + Pb^{++} \rightarrow Pb\ EEDTA^-$$

Thus, for every lead ion which is present, one zinc ion will be released, and since a given quantity of lead causes greater difficulty than corresponding amount of zinc, this rearrangement gives desirable results.

In most rayon operations lead is the main problem because a white yarn is the object of the manufacturing operation, but for tire cord, color is no problem, whereas the zinc does cause difficulty.

Thus it is apparent that the specific application of this chelation reaction to the manufacture of fertilizer is merely an illustration of the more basic control of metal ions in a strongly acid medium. Accordingly, with respect to rayon, the usual procedure in handling metal ion has been to rinse the yarn with a one percent solution of the chelating agent which has been adjusted to a pH of approximately 5.5. The rinse is generally given the rayon after the initial washing to remove surplus sulfuric acid, but before the desulfurizing bath. In continuous processes the complexing stage is carried out in about 2 minutes at 160° to 180° F. and in batch processes the complexing bath requires about 15 minutes at from 160° to 180° F. The rinse is then followed by a clear water rinse before the rayon is passed on to the desulfurizing bath.

In accordance with this invention a more effective control of complexing agents can be made by adding complexing agent to the sulfuric acid coagulating bath. Where this is done a complexing agent having solubility in the strong acid should be used. Of those which have been outlined, the hydroxy ethyl compounds are preferred because they have the greatest solubility in water and in very strong acid solutions.

Since the concentration of lead in sulfuric acid is substantially constant and can be readily determined, and this is the most important source of lead contamination of the coagulated fiber, control of the situation can be effected if sufficient complexing agent is introduced into the sulfuric acid to complex the quantity of lead contained therein. In this way avoidance of the contamination of the coagulated yarn with lead is accomplished.

Admittedly, during the neutralization of the xanthate and the coagulation of the viscose the sulfuric acid solution will contain lead ions as well as the complexing agent ions. Complexing of the lead is not expected under the acid conditions existing. However, after coagulation has taken place there is a lowering of pH of the entire system. Some of this acid neutralization is obtained because of the high alkalinity of the viscose itself and while the outside of the fiber will be quite acid there will be a pH change to the alkaline side in the center of the fiber. As the sulfuric acid diffuses into the fiber it will be neutralized and with this acid neutralization, the complexing agent will regain its complexing activity for lead.

Therefore, in the finished coagulated fiber, the complexing agent will easily react with any lead that was carried into the fiber with the acid. This lead will be in the form of the lead chelate and will be very easily removed by a simple hot water rinse which is, incidentally, a standard operation and would require no change whatsoever in either equipment or plant scheduling.

If the complexing agent is used in this way maximum efficiency of the complexing agent is obtained since the amount of complexing agent added is directly dependent upon the concentration of lead in the sulfuric acid. The solution of the lead sulfate and its removal from the fiber are very rapid since the lead chelate has only to diffuse from the fiber into the rinse solution. In the customary way of using ethylene diamine tetraacetic acid the dilute solution must diffuse into the fiber, react with the lead sulfate and then the lead chelate must diffuse from the fiber. By using the complexing agent in the acid coagulating bath itself we have eliminated two phases of the reaction.

Still another application of the basic concept of control of metal ions in acid solution is the utilization of mixtures of chelating agents and acids, especially of mineral acids, as scale removing agents. Such mixtures possess certain advantages over a mineral acid alone in that the strong chelating tendencies of such chelating agents as ethylenediaminetetraacetic acid and N-hydroxyethyl ethylenediaminetriacetic acid for most metals makes possible the use of lower concentrations of mineral acid with simultaneous minimization of hydrogen embrittlement.

The equilibria involved are like those in the previously described system characterized by the presence of an acid, chelating agent and metals. Such a system of chelating agent and acid is useful for the removal of scale from various types of equipment and permits the use of higher pH values than are generally feasible in acid cleaning. At the same time, hydrogen embrittlement is minimized, effective removal of normally insoluble scales is realized and precipitation of insoluble salts of metals is prevented.

This application is a continuation-in-part of our application Serial No. 389,166, filed October 29, 1953, now abandoned.

What is claimed is:

1. In the manufacture of ammonium fertilizers characterized by the neutralization of an acid selected from the group consisting of phosphoric acid, sulfuric acid, nitric acid and mixtures thereof, with gaseous ammonia, the improvement which comprises adding to the said acid prior to ammoniation a chelating agent thereby to maintain metal ions contaminating said acid in solution, said chelating agent corresponding to the following generic formula:

wherein X is selected from the group consisting of

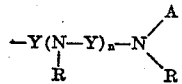

—CH$_2$CH$_2$OH, —CH$_2$COOM, —CH$_2$CH$_2$COOM, R is selected from the group consisting of —CH$_2$CN, —CH(CH$_3$)CN, —CH$_2$CH$_2$CN, —CH$_2$COOM,

—CH(CH$_3$)COOM

—CH$_2$CH$_2$COOM; Y represents a bivalent alkylene radical which places 2–3 carbon atoms between the nitrogens; A is selected from the group consisting of R, and may be the same as R, and —CH$_2$CH$_2$OH,

—CH(CH$_3$)CH$_2$OH $n$ is an integer having a value in the range 0–4, and M is selected from the group consisting of hydrogen, alkali metal and ammonium, the amount of said chelating agent in said medium being sufficient at least to react with all of the metal ions in the crude acid.

2. The method in accordance with claim 1, wherein the chelating agent is monohydroxy ethyl ethylene diamine triacetic acid.

3. The method in accordance with claim 1, wherein the chelating agent is dihydroxy ethyl ethylene diamine diacetic acid.

4. A solid ammonium fertilizer composition formed from a crude acid selected from the group consisting of phosphoric acid, sulfuric acid, nitric acid and mixtures thereof, the said crude acid containing traces of heavy metals, substantially neutralized with ammonia, said product including heavy metal chelates, said chelates being metal chelates of chelating agents corresponding to the following generic formula:

wherein X is selected from the group consisting of

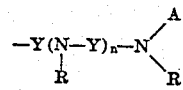

—CH$_2$CH$_2$OH, —CH$_2$COOM, —CH$_2$CH$_2$COOM, R is selected from the group consisting of —CH$_2$CN,

—CH(CH$_3$)CN

—CH$_2$CH$_2$CN, —CH$_2$COOM, —CH(CH$_3$)COOM,

—CH$_2$CH$_2$COOM

A is selected from the group consisting of R, and may be the same as R, and —CH$_2$CH$_2$OH,

—CH(CH$_3$)CH$_2$OH

Y represents a bivalent alkylene radical which places 2–3 carbon atoms between the nitrogens; $n$ is an integer having a value in the range 0–4, and M is selected from the group consisting of hydrogen, alkali metal and ammonium, the amount of said chelating agent in said medium being sufficient at least to complex all of the metal ions in the crude acid, said reaction product being that formed when the said acid is ammoniated to the degree of neutralization sought, the solid reaction product being crystallized and separated.

5. An ammonium phosphate fertilizer in accordance with claim 4, which contains from about 0.01 percent to 25 percent of the said chelating agent.

6. An ammonium phosphate fertilizer in accordance with claim 5, containing about 4 percent of ethylenediaminetetraacetic acid.

7. An ammonium phosphate fertilizer in accordance with claim 5, containing about 8 percent of ethylenediaminetetraacetic acid.

8. An ammonium phosphate fertilizer in accordance with claim 5, containing about 4 percent of N-hydroxyethylethylenediaminetriacetic acid.

9. An ammonium phosphate fertilizer in accordance with claim 5, containing about 8 percent of N-hydroxyethylethylenediaminetriacetic acid.

10. An ammonium phosphate fertilizer in accordance with claim 5, containing at least a 100 percent excess of free chelating agent over that necessary to complex heavy metal ions occurring in the phosphoric acid from which the ammonium phosphate is formed.

11. An ammonium nitrate fertilizer in accordance with claim 4, characterized by its containing from about 0.01 percent by weight to about 25 percent by weight of metal chelate.

References Cited in the file of this patent

UNITED STATES PATENTS

| | | |
|---|---|---|
| 2,222,735 | Bancroft et al. | Nov. 26, 1940 |
| 2,625,529 | Hedrick et al. | Jan. 13, 1953 |
| 2,828,182 | Cheronis et al. | Mar. 25, 1958 |
| 2,830,887 | Bersworth | Apr. 15, 1958 |
| 2,833,640 | Bersworth | May 6, 1958 |

OTHER REFERENCES

Plant Physiology, Jacobson, Maintenance of Iron Supply in Nutrient Solutions, Addition of Ferric Potassium EDTA, April 1951, pages 411–413.

Agricultural Chem., Alexander et al., Control of Iron Chlorosis, July 1952, pages 36–38.

Science, Stewart et al., Chelates as Source of Iron for Plants, Nov. 21, 1952, pages 564–66.